United States Patent
Hensley et al.

(10) Patent No.: US 6,928,798 B2
(45) Date of Patent: Aug. 16, 2005

(54) SWING OUT ARM FOR REAR ROTARY DECK

(75) Inventors: Ryan Lee Hensley, Charlotte, NC (US); Miguel A. Espina, Matthews, NC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/751,254

(22) Filed: Jan. 2, 2004

(65) Prior Publication Data

US 2005/0144922 A1   Jul. 7, 2005

(51) Int. Cl.[7] ................... A01D 34/03; A01D 34/43; A01D 34/64
(52) U.S. Cl. ........................................ 56/14.9
(58) Field of Search .................. 56/14.7, 14.9, 56/15.1, 15.2, 15.3, 15.5, 15.6, 15.8, DIG. 10, 56/DIG. 14, DIG. 22

(56) References Cited

U.S. PATENT DOCUMENTS

| | | | |
|---|---|---|---|
| 4,445,312 A * | 5/1984 | Cartner | 56/15.5 |
| 5,423,565 A * | 6/1995 | Smith | 280/411.1 |
| 5,553,445 A | 9/1996 | Lamb et al. | |
| 5,704,201 A * | 1/1998 | Van Vleet | 56/14.9 |
| 5,966,912 A * | 10/1999 | Swisher et al. | 56/1 |
| 5,970,690 A * | 10/1999 | Toman | 56/7 |
| 6,336,312 B1 | 1/2002 | Bednar et al. | |
| 2003/0140610 A1 * | 7/2003 | Bokyo | 56/14.9 |

* cited by examiner

*Primary Examiner*—Árpád Fábián Kovács
(74) *Attorney, Agent, or Firm*—Harness, Dickey & Pierce, P.L.C.

(57) ABSTRACT

A rotary lawn mower having a frame supported by a plurality of wheels for movement over the ground and a rotary cutting deck assembly. A support bracket assembly is pivotally coupled to the frame for movement about a generally vertical axis. A telescoping arm is pivotally coupled between the support bracket assembly and the rotary cutting deck assembly and is adjustable into at least two lengths. An actuator is pivotally coupled between the support bracket assembly and the telescoping arm and is operable to move the rotary cutting deck assembly between a non-cutting position and a cutting position and further capable of retracting the telescoping arm between the at least two lengths to permit the rotary cutting deck assembly to be swung to a side of the frame for easy inspection, maintenance, and adjustment.

15 Claims, 4 Drawing Sheets

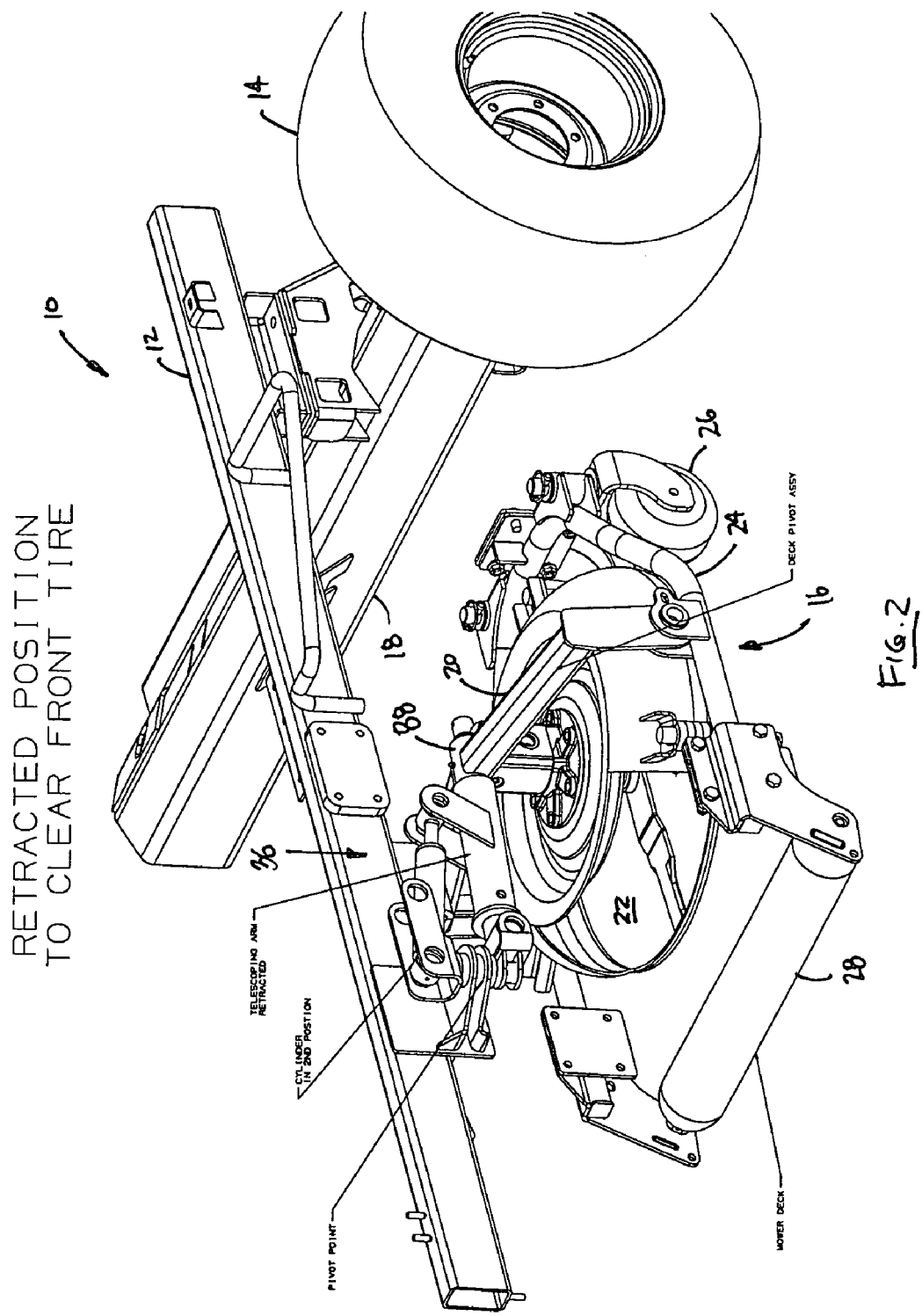

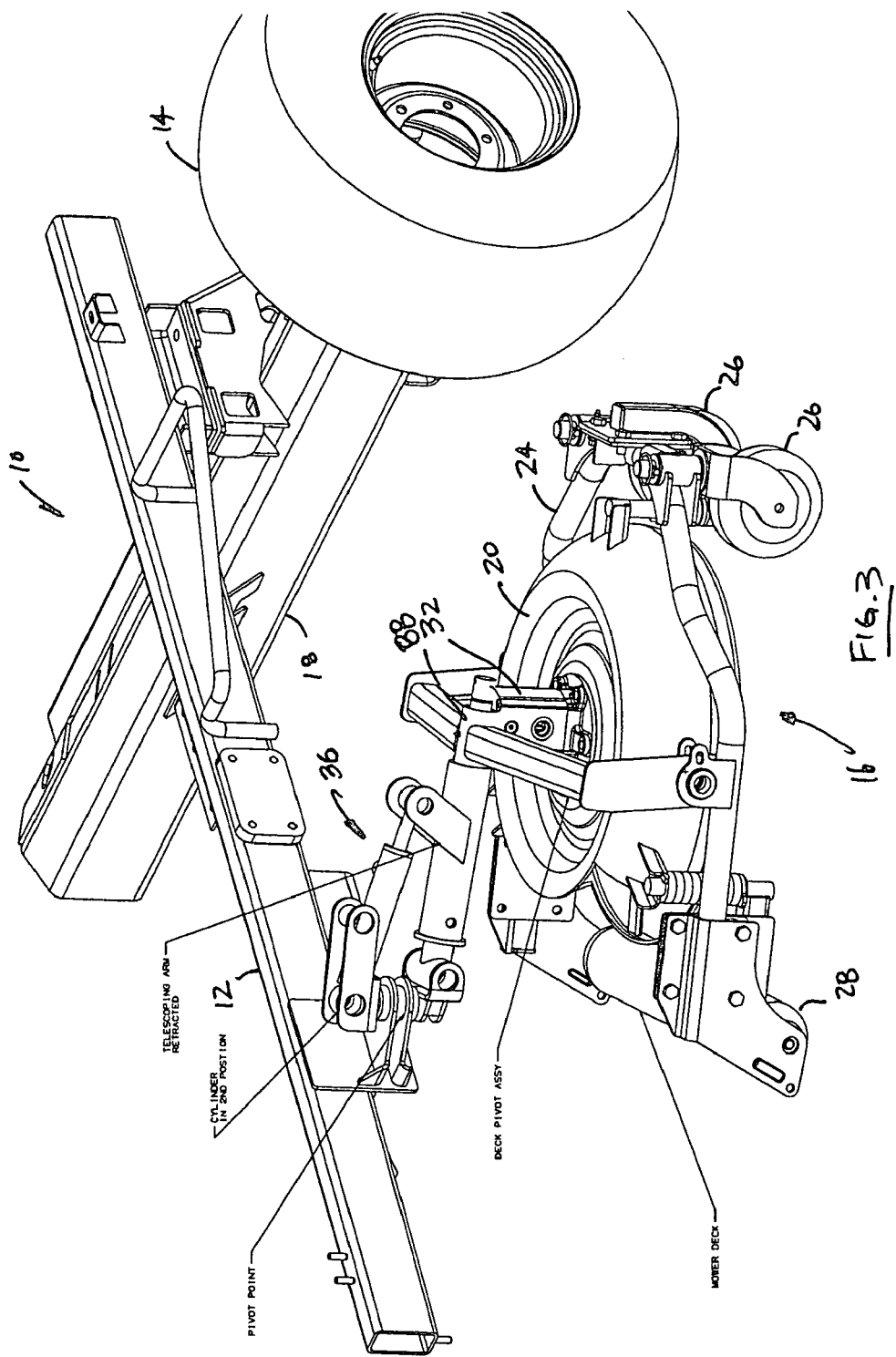

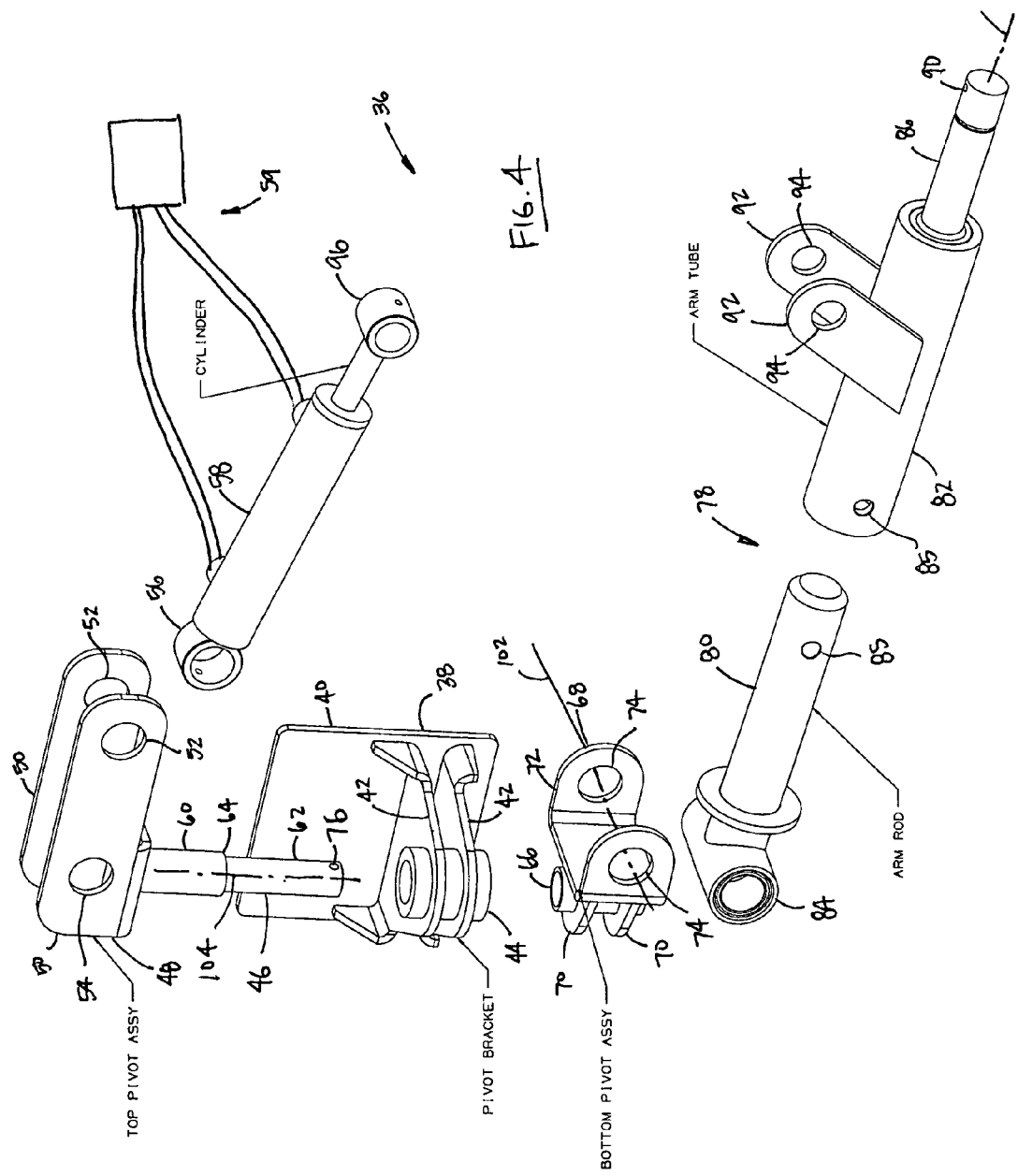

SWING OUT ARM FOR REAR ROTARY DECK

FIELD OF THE INVENTION

The present invention relates to rotary lawn mowers and, more particularly, relates to a swing out arm for ganged rotary turf mowers that permits convenient servicing.

BACKGROUND OF THE INVENTION

Rotary-type lawn mowers or cutting units mounted on tractors in a ganged relationship are well known in this art. In this arrangement, the cutting units are propelled by the tractor and can be moved up and down relative to the ground while in an operating position or into a transport position. Lift arm mechanisms are often used to operably couple these cutting units to the tractor such that the cutting units move automatically up and down according to the undulations of the ground itself.

As a result of these ground undulations, it is preferable that each of the cutting units are mounted as closely to a region below the tractor axles as possible. In this regard, as the tractor travels over these ground undulations, the wheels of the tractor serve to maintain a constant distance between the cutting units and the ground to provide a consistent and reliable cut.

However, cutting units mounted in this region below the axles of the tractor are often difficult to service or adjust. Those skilled in the art will readily appreciate the difficulty of servicing the cutting units when they are disposed beneath the tractor.

Accordingly, there exists a need in the relevant art to provide a ganged rotary turf mower having a cutting unit that is capable of being positioned generally within a region below an axle of a tractor, which is also capable of being repositioned to permit quick and convenient adjustment or maintenance. Furthermore, there exists a need in the relevant art to provide a ganged rotary turf mower having a cutting unit mounted thereto via a pivotal connection to facilitate such repositioning. Still further, there exists a need in the relevant art to provide a ganged rotary turf mower that overcomes the disadvantages of the prior art.

SUMMARY OF THE INVENTION

According to the principles of the present invention, a rotary lawn mower is provided having an advantageous construction. The rotary lawn mower specifically includes a frame supported by a plurality of wheels for movement over the ground and a rotary cutting deck assembly. A support bracket assembly is pivotally coupled to the frame for movement about a generally vertical axis. A telescoping arm is pivotally coupled between the support bracket assembly and the rotary cutting deck assembly and is adjustable into at least two lengths. An actuator is pivotally coupled between the support bracket assembly and the telescoping arm and is operable to move the rotary cutting deck assembly between a non-cutting position and a cutting position and further capable of retracting the telescoping arm between the at least two lengths to permit the rotary cutting deck assembly to be swung to a side of the frame for easy inspection, maintenance, and adjustment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a perspective view illustrating the lawn mower employing the lifting system according to the principles of the present invention in a retracted position;

FIG. 3 is a perspective view illustrating the lawn mower employing the lifting system according to the principles of the present invention in a swung-out position; and FIG. 4 is an exploded perspective view illustrating the lifting system.

DETAILED DESCRIPTION OF THE PREFERRED EMBODIMENTS

Figure 1:
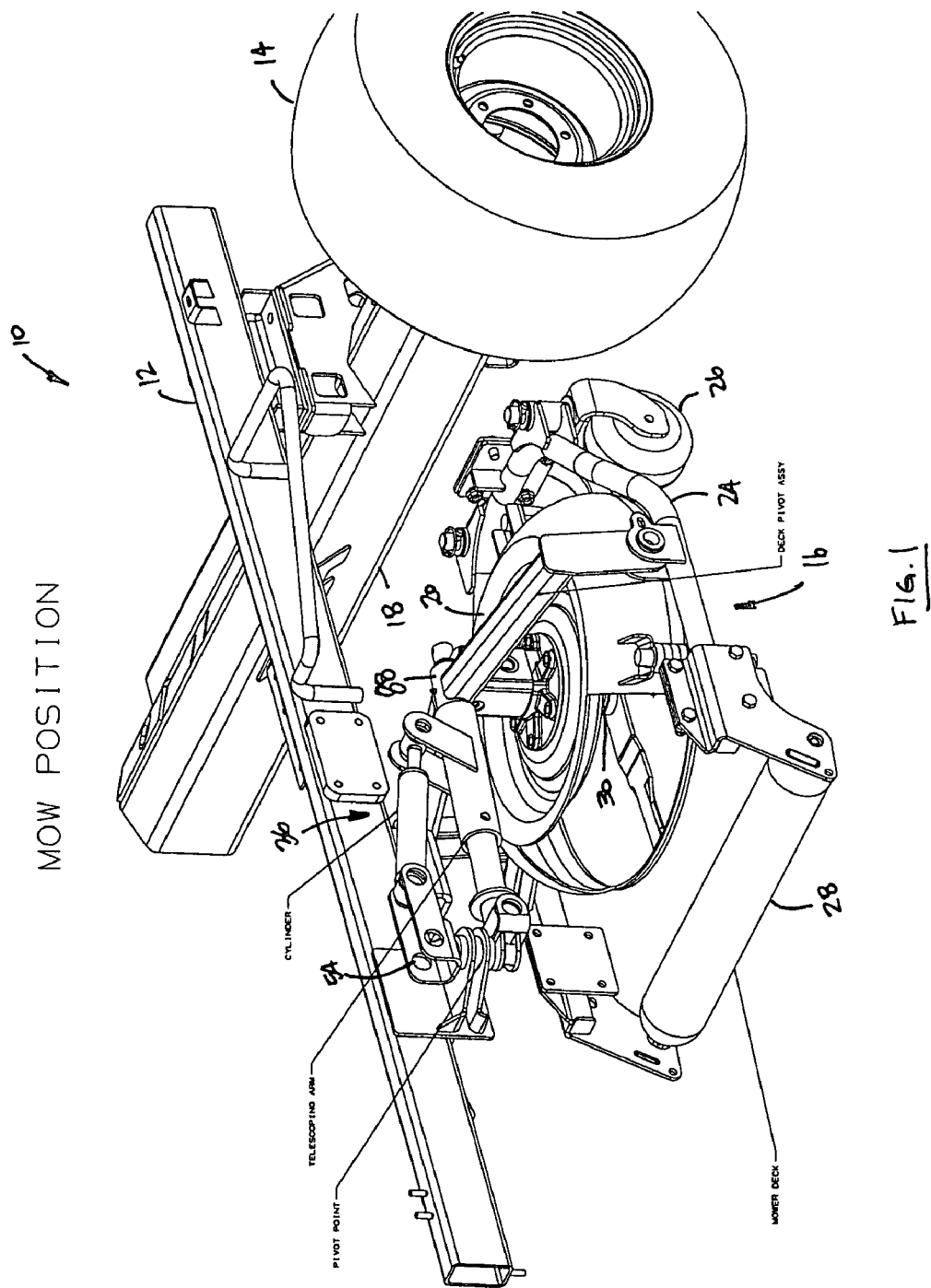
FIG. 1 is a perspective view illustrating a lawn mower employing a lifting system according to the principles of the present invention in a cutting position.

The following description of the preferred embodiment is merely exemplary in nature and is in no way intended to limit the invention, its application, or uses.

Referring now to the figures, a lawn mower 10 is provided in accordance with the principles of the present invention. Lawn mower 10 comprises a frame 12 (partially shown in FIGS. 1–3) supported by front wheels 14 and at least one rear wheel (not shown) for movement over the ground. While the illustrated lawn mower 10 is four-wheeled and rear-steering, it should be understood that the invention is applicable alternative lawn mower configurations.

Lawn mower 10 further comprises a power source (not shown) supported by frame 12. The power source may be any type known in the art, such as a gasoline-powered, internal-combustion engine. The engine drives a hydraulic pump (not shown) that supplies hydraulic fluid to hydraulic motors (not shown) drivingly connected to the wheels.

Lawn mower 10 further comprises a plurality of ganged cutting deck assemblies 16. More particularly, lawn mower 10 preferably includes a plurality of cutting deck assemblies 16 disposed below frame 12 and inboard from front wheels 14. As best seen in FIG. 1, cutting deck assembly 16 is preferably positioned in a region generally below a front axle 18 of lawn mower 10. In this position, cutting deck assembly 16 is able to maintain a proper and consistent cut height.

Each of the cutting deck assemblies 16 includes (see FIGS. 1–3) a single-spindle mulching deck 20 defining a downwardly opening space 22 (FIG. 2). Deck 20 is located between and supported by a generally continuous, lateral, tubular support member 24. The term "lateral" is used herein to mean the direction from one side of lawn mower to the other, i.e., perpendicular to the forward-rearward direction. Two deck wheels 26 are pivotally coupled in a caster arrangement to tubular support member 24, such that deck wheels 26 support a forward edge of deck 20 for movement over the ground. A rear roller 28 extends between free ends of tubular support member 24 and supports deck 20 for movement over the ground. Rear roller 28 is behind deck 20 and extends across substantially the entire width of deck 20. Rear roller 28 resists scalping and stripes the grass. Deck 20 is mounted such that the height of deck 20 relative to the ground is adjustable.

A single spindle 30 is mounted for rotation about a generally vertical axis within the space 22 defined by deck 20. Spindle 30 is driven by a motor 32 on top of deck 20. A set of cutting blades is mounted on spindle 30 for rotation therewith. A pair of inclined deck supports 34 extend between opposing sides of tubular support member 24 and motor 32 to provide rigidity and support to deck 20 and an associated lifting system 36.

Still referring to FIGS. 1–3, lifting system 36 includes a hydraulic assembly connected between the pair of inclined deck supports 34 and frame 12. Lifting system 36 serves to lift deck 20 between a raised position and a lowered cutting position. As will be described below, lifting system 36 also serves as a swing out arm to permit deck 20 to be retracted from front wheels 14 and swung to the side of lawn mower 10 to permit the simple and convenient adjustment, inspection, or maintenance thereof. When deck 20 is lowered into the cutting position, the lifting system and hydraulic assembly "float" to allowing deck 20 to move vertically relative to frame 12.

With particular reference to FIG. 4, lifting system 36 comprises a pivot bracket 38 fixedly mounted to frame 12 via conventional methods, such as fastening, welding, and the like. Pivot bracket 38 includes a generally planar portion 40 for coupling with frame 12 and a pair of generally horizontally-disposed support wings 42. Support wings 42 include a generally vertically-disposed sleeve 44 sized to receive a pivot pin 46 extending from a top pivot member 48.

Top pivot member 48 includes a pair of upwardly turned side plates 50 having a first set of axially-aligned apertures 52 and a second set of axially-aligned apertures 54 (partially shown in FIGS. 1 and 4). Plates 50 are spaced apart to receive a first end 56 of a hydraulic cylinder 58 therein. Likewise, apertures 52 and 54 are sized to receive a fastener (not shown) extending through apertures 52 and 54 and a bore formed in first end 56 of hydraulic cylinder 58. The fastener is preferably a bolt and nut configuration or a stud and cotter pin configuration.

Pivot pin 46 includes a first diameter 60 and a second diameter 62. Second diameter 62 being smaller than first diameter 60 thereby defining a shoulder 64. First diameter 60 is sized to provide a smooth pivoting action between pivot pin 46 and sleeve 44. Similarly, second diameter 62 is sized to be received within a sleeve 66 of a bottom pivot member 68. Sleeve 66 is supported by a pair of wing supports 70 that are coupled to a U-shaped member 72. U-shaped member 72 includes a single pair of axially-aligned apertures 74. Second diameter 62 of pivot pin 46 is received within sleeve 66 of bottom pivot member 68 and retained in such a position via a cotter pin (not shown) extending through a bore 76 formed in pivot pin 46.

A telescoping arm 78 is further provided having an inner rod 80 and an outer tube 82. Inner rod 80 has a first end 84 defining a bore. Apertures 74 are sized to receive a fastener (not shown) extending through apertures 74 and the bore formed in first end 84 of telescoping arm 78. The fastener is preferably a bolt and nut configuration or a stud and cotter pin configuration.

Inner rod 80 and outer tube 82 are adapted to be slidably coupled to permit a telescoping function. To this end, the outer diameter of inner rod 80 is sized to closely conform to an inner diameter of outer tube 82 to permit the smooth extension and retraction of outer tube 82 relative to inner rod 80. A locking device, such as a pair of alignable bores 85 capable of receiving a bolt and cotter pin assembly, is provided to lock telescoping arm 78 in a predetermined length.

As best seen in FIG. 4, outer tube 82 includes a pivot pin 86 extending at an end thereof. Pivot pin 86 is sized to be pivotally received within a sleeve 88 (FIGS. 1–3) coupled to inclined desk supports 34 of deck 20. Pivot pin 86 includes a bore 90 for receiving a cotter pin to retain deck 20 in connection with lifting system 36.

Outer tube 82 further includes a pair of mounting plates 92 fixedly coupled to outer tube 82 in a parallel relationship. Mounting plates 92 further include a pair of a set of axially-aligned apertures 94. Apertures 94 are sized to receive a fastener (not shown) extending through apertures 94 and a bore formed in a second end 96 of hydraulic cylinder 58. The fastener is preferably a bolt and nut configuration or a stud and cotter pin configuration.

The connection of deck 20 to frame 12 via lifting system 36 allows deck 20 to pivot relative to frame 12 about the three mutually perpendicular axes 100, 102, and 104 (FIG. 4). This mounting arrangement enables deck 20 to adjust to undulating terrain, thereby substantially avoiding scalping.

In operation, deck 20 may be positioned in a forward raised (non-cutting) position, a forward lowered (cutting) position, a retracted (intermediate) position (FIG. 2), and a swing out (maintenance) position (FIG. 3). It order to position deck 20 in the above described positions, hydraulic cylinder 58, which is coupled to first set of axially-aligned apertures 52, is extended so as to pivot telescoping arm 78 about axis 102 and lower deck 20 into the forward lowered (cutting) position in response to actuation of a hydraulic system 59. In this position, hydraulic cylinder 58 is permitted to freely vent hydraulic fluid to a fluid sump, thereby enabling deck 20 to be free floating to permit it to accommodate various ground undulations. Hydraulic cylinder 58 may again be energized into a retract position to raise deck 20 into the forward raised (non-cutting) position.

However, in order to adjust, inspect, or maintain deck 20, or more generally cutting deck assembly 16, deck 20 may be positioned in the swing out (maintenance) position according to the following operation. Initially, the connection between hydraulic cylinder 58 and top pivot member 48 is removed such that first end 56 of hydraulic cylinder 58 may then be coupled to second set of axially-aligned apertures 54. Additionally, the locking device extending through bores 85 is removed. In this arrangement, hydraulic cylinder 58 is then retracted to pull deck 20 rearwardly. This movement causes deck 20 to move rearward driving outer tube 82 of telescoping arm 78 against inner rod 80, thereby telescoping telescoping arm 78 into a retracted position. This motion is intended to retracted deck 20 away from front wheel 14 to permit deck 20 to then pivot about axis 104 into the swung out position (FIG. 3). In this position, deck 20 can be easily inspected, maintained, or adjusted without requiring prolonged work beneath lawn mower 10. When deck 20 is in a condition to be returned to service, the opposite movement is used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotary lawn mower comprising:

a frame supported by front wheels and at least one rear wheel for movement over the ground;

at least one rotary cutting deck assembly;

a lifting system coupling said at least one rotary cutting deck assembly to said frame, said lifting system operable to lift and pivot said at least one rotary cutting deck assembly about a generally vertical axis between a first position generally below said frame and a second position generally to a side of said frame, said lifting system having a support bracket assembly pivotally coupled to said frame for movement about said generally vertical axis, a telescoping arm pivotally coupled between said support bracket assembly and said at least one rotary cutting deck assembly, and an actuator pivotally coupled between said support bracket assembly and said telescoping arm, said actuator operable to move said at least one rotary cutting deck assembly between a non-cutting position and a cutting position, said support bracket assembly having a pivot bracket fixedly mounted to said frame, said pivot bracket having a sleeve;

a first pivot member having a pivot pin downwardly extending therefrom, said pivot pin being disposed within said sleeve of said pivot bracket, said first pivot member supporting said actuator;

a second pivot member having a sleeve, said second pivot member receiving said pivot pin extending from said pivot bracket, said second pivot member supporting said telescoping arm; and a locking device retaining said pivot bracket, first pivot member, and second pivot member in an assembled configuration.

2. The rotary lawn mower according to claim 1 wherein said actuator is mountable to said first pivot member in a first location and a second location, said second location being spaced apart from said first location.

3. The rotary lawn mower according to claim 2 wherein when said actuator is mounted in said first location, said at least one rotary cutting deck assembly may be positioned in either of said cutting position and said non-cutting position, when said actuator is mounted in said second position, said at least one rotary cutting deck assembly may be positioned in either a position generally under said frame or a swung out position generally to a side of said frame to permit convenient access to said at least one rotary cutting deck assembly.

4. The rotary lawn mower according to claim 1 wherein said telescoping arm comprises:

an inner rod pivotally coupled to said support bracket assembly;

an outer tube slidably disposed over at least a portion of said inner rod for slidable engagement therewith; and a locking device operable to selectively prevent relative movement between said inner rod and said outer tube.

5. The rotary lawn mower according to claim 4, said telescoping arm further comprising:

a pivot pin extending from said outer tube, said pivot pin being generally coaxial with said outer tube, said pivot pin engagable with a sleeve mounted on said at least one rotary cutting deck assembly to permit rotation thereof.

6. A rotary lawn mower comprising:

a frame supported by a plurality of wheels for movement over the ground;

a rotary cutting deck assembly;

a support bracket assembly pivotally coupled to said frame for movement about a generally vertical axis;

a telescoping arm pivotally coupled between said support bracket assembly and said rotary cutting deck assembly, said telescoping arm being adjustable into at least two lengths; and an actuator pivotally coupled between said support bracket assembly and said telescoping arm, said actuator operable to move said rotary cutting deck assembly between a non-cutting position and a cutting position and further capable of retracting said telescoping arm between said at least two lengths; said support bracket assembly having:

a pivot bracket fixedly mounted to said frame, said pivot bracket having a sleeve;

a first pivot member having a pivot pin downwardly extending therefrom, said pivot pin being disposed within said sleeve of said pivot bracket, said first pivot member supporting said actuator;

a second pivot member having a sleeve, said second pivot member receiving said pivot pin extending from said pivot bracket, said second pivot member supporting said telescoping arm; and a locking device retaining said pivot bracket, first pivot member, and second pivot member in an assembled configuration.

7. The rotary lawn mower according to claim 6 wherein said actuator is mountable to said first pivot member in a first location and a second location, said second location being spaced apart from said first location.

8. The rotary lawn mower according to claim 7 wherein when said actuator is mounted in said first location said rotary cutting deck assembly may be positioned in either of said cutting position and said non-cutting position, when said actuator is mounted in said second position said rotary cutting deck assembly may be positioned in either a position generally under said frame or a swung out position generally to a side of said frame to permit convenient access to said rotary cutting deck assembly.

9. The rotary lawn mower according to claim 8 wherein said telescoping arm comprises:

an inner rod pivotally coupled to said support bracket assembly;

an outer tube slidably disposed over at least a portion of said inner rod for slidable engagement therewith; and a locking device operable to selectively prevent relative movement between said inner rod and said outer tube.

10. The rotary lawn mower according to claim 9, said telescoping arm further comprising:

a pivot pin extending from said outer tube, said pivot pin being generally coaxial with said outer tube, said pivot pin engagable with a sleeve mounted on said rotary cutting deck assembly to permit rotation thereof.

11. A rotary lawn mower comprising:

a frame supported by a plurality of wheels for movement over the ground;

a rotary cutting deck assembly;

a pivot bracket fixedly mounted to said frame, said pivot bracket having a sleeve;

a first pivot member having a pivot pin downwardly extending therefrom, said pivot pin being disposed within said sleeve of said pivot bracket, said first pivot member supporting said actuator;

a second pivot member having a sleeve, said second pivot member receiving said pivot pin extending from said pivot bracket, said second pivot member supporting said telescoping arm;

a locking device retaining said pivot bracket, first pivot member, and second pivot member in an assembled configuration;

a telescoping arm pivotally coupled between said second pivot member and said rotary cutting deck assembly; and an actuator pivotally coupled between said first pivot member and said telescoping arm, said actuator operable to move said rotary cutting deck assembly between a non-cutting position and a cutting position and further capable of retracting said telescoping arm to permit said rotary cutting deck to be swung to a side of said frame.

12. The rotary lawn mower according to claim 11 wherein said actuator is mountable to said first pivot member in a first location and a second location, said second location being spaced apart from said first location.

13. The rotary lawn mower according to claim 12 wherein when said actuator is mounted in said first location said rotary cutting deck assembly may be positioned in either of said cutting position and said non-cutting position, and when said actuator is mounted in said second position said rotary cutting deck assembly may be positioned in either a position generally under said frame or a swung out position generally to a side of said frame to permit convenient access to said rotary cutting deck assembly.

14. The rotary lawn mower according to claim 11 wherein said telescoping arm comprises:

an inner rod pivotally coupled to said second pivot member;

an outer tube slidably disposed over at least a portion of said inner rod for slidable engagement therewith; and a locking device operable to selectively prevent relative movement between said inner rod and said outer tube.

15. The rotary lawn mower according to claim 14, said telescoping arm further comprising:

a pivot pin extending from said outer tube, said pivot pin being generally coaxial with said outer tube, said pivot pin engagable with a sleeve mounted on said rotary cutting deck assembly to permit rotation thereof.

* * * * *